US009178666B2

(12) United States Patent
Park et al.

(10) Patent No.: US 9,178,666 B2
(45) Date of Patent: Nov. 3, 2015

(54) METHOD FOR OPERATING MULTI-TYPE BEACONS

(75) Inventors: Seung-Hoon Park, Seoul (KR);
Chi-Hong Cho, Gyeonggi-do (KR);
Noh-Gyoung Kang, Seoul (KR);
Sun-Gi Gu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 306 days.

(21) Appl. No.: 12/888,069

(22) Filed: Sep. 22, 2010

(65) Prior Publication Data

US 2011/0070836 A1 Mar. 24, 2011

(30) Foreign Application Priority Data

Sep. 22, 2009 (KR) .................. 10-2009-0089813

(51) Int. Cl.
*H04L 1/18* (2006.01)
*H04L 29/06* (2006.01)
*H04W 48/12* (2009.01)
*H04L 1/00* (2006.01)
*H04W 72/04* (2009.01)

(52) U.S. Cl.
CPC .............. *H04L 1/1887* (2013.01); *H04L 63/00* (2013.01); *H04W 72/048* (2013.01); *H04L 1/18* (2013.01); *H04L 2001/0093* (2013.01); *H04W 48/12* (2013.01); *H04W 72/042* (2013.01)

(58) Field of Classification Search
CPC . H04L 47/10; H04L 12/2801; H04L 63/1408; H04L 1/1887; H04L 63/00; H04W 76/00; H04W 48/10; H04W 72/048; H04W 48/12
See application file for complete search history.

(56) References Cited

U.S. PATENT DOCUMENTS

| 2005/0128989 | A1* | 6/2005 | Bhagwat et al. | 370/338 |
|---|---|---|---|---|
| 2006/0174030 | A1* | 8/2006 | Choi et al. | 709/236 |
| 2007/0047510 | A1* | 3/2007 | Cho et al. | 370/338 |
| 2007/0076681 | A1* | 4/2007 | Hong et al. | 370/349 |
| 2007/0211745 | A1* | 9/2007 | Deshpande et al. | 370/432 |
| 2008/0276303 | A1* | 11/2008 | Gast | 726/3 |
| 2008/0316949 | A1* | 12/2008 | Yamamoto | 370/311 |
| 2009/0175250 | A1* | 7/2009 | Mathur et al. | 370/338 |
| 2010/0067428 | A1* | 3/2010 | Cordeiro et al. | 370/315 |
| 2010/0111006 | A1* | 5/2010 | Zhai et al. | 370/329 |
| 2010/0290387 | A1* | 11/2010 | Chou et al. | 370/328 |
| 2011/0070836 | A1* | 3/2011 | Park et al. | 455/41.2 |

FOREIGN PATENT DOCUMENTS

WO WO 2008/099367 8/2008

OTHER PUBLICATIONS

Korean Office Action dated Sep. 9, 2015 issued in counterpart application No. 10-2009-0089813, 7 pages.

* cited by examiner

*Primary Examiner* — Andrew Chriss
*Assistant Examiner* — Salvador E Rivas
(74) *Attorney, Agent, or Firm* — The Farrell Law Firm, P.C.

(57) ABSTRACT

Provided is a method for operating multi-type beacons by a first terminal connected with at least one second terminal through short-range communication. The method includes checking at least one variable related to the second terminal, allocating one selected from a plurality of beacons having different characteristics to the second terminal, taking into account the checked variable, and transmitting the beacon allocated to the second terminal.

22 Claims, 12 Drawing Sheets

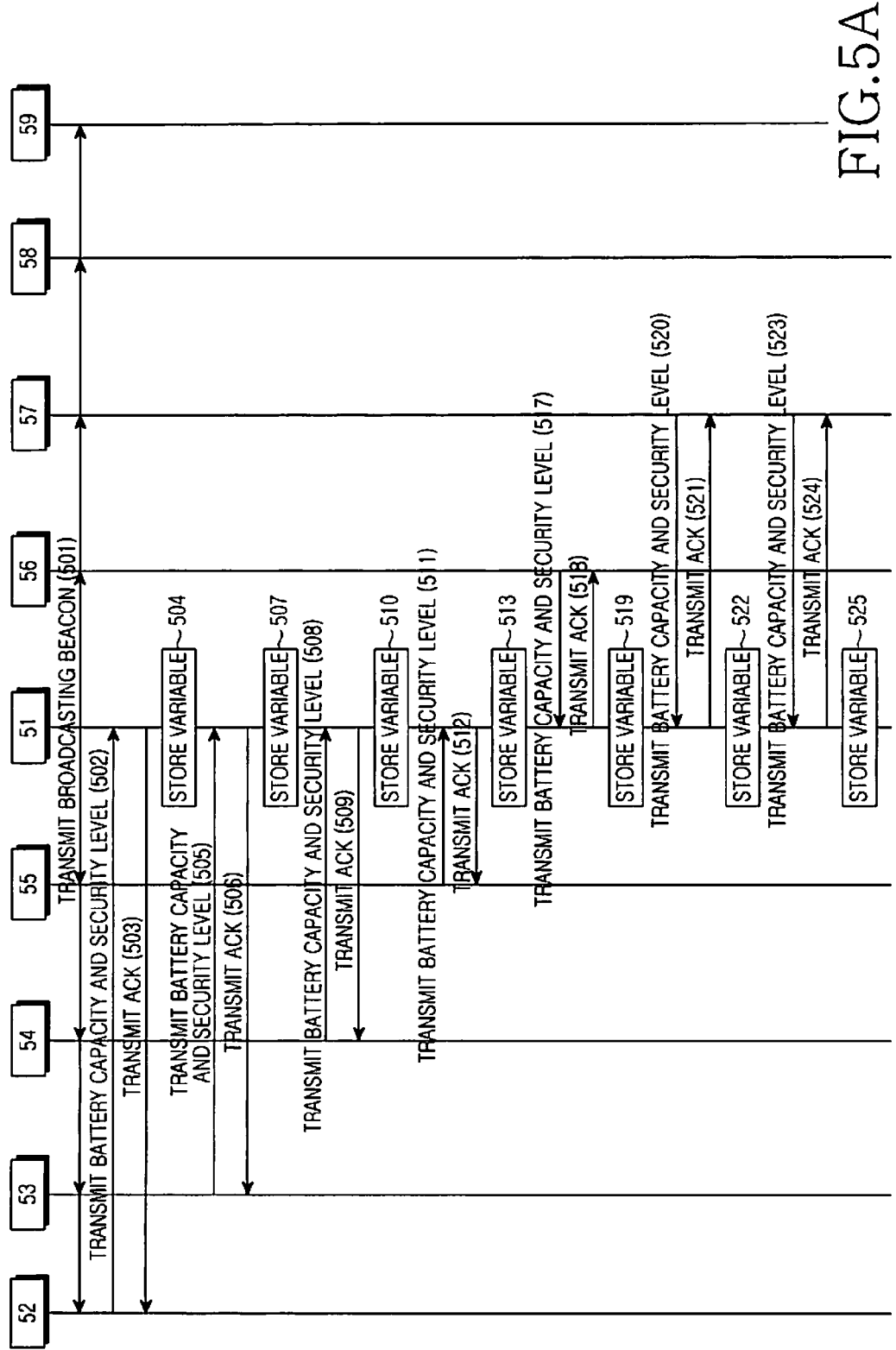

PT : PARTICIPATING TERMINAL

| VARIABLE \ PT | D1 | D2 | D3 | D4 | D5 | D6 | D7 | D8 |
|---|---|---|---|---|---|---|---|---|
| VARIABLE 1 | 2 | 2 | 1 | 2 | 2 | 2 | 2 | 2 |
| VARIABLE 2 | 3 | 3 | 1 | 3 | 2 | 2 | 2 | 2 |
| VARIABLE 3 | 3 | 3 | 3 | 3 | 2 | 2 | 3 | 1 |
| VARIABLE 4 | 3 | 1 | 3 | 3 | 3 | 3 | 2 | 2 |

FIG.6

PT : PARTICIPATING TERMINAL

| VARIABLE\PT | D1 | D2 | D3 | D4 | D5 | D6 | D7 | D8 |
|---|---|---|---|---|---|---|---|---|
| VARIABLE 1 | 2 | 2 | 1 | 2 | 2 | 2 | 2 | 2 |
| VARIABLE 2 | 3 | 3 | 1 | 3 | 2 | 2 | 2 | 2 |
| VARIABLE 3 | 3 | 3 | 3 | 3 | 2 | 2 | 3 | 1 |
| VARIABLE 4 | 3 | 1 | 3 | 3 | 3 | 3 | 2 | 2 |

| VARIABLE\PT | D1 | D2 | D3 | D4 | D5 | D6 | D7 | D8 |
|---|---|---|---|---|---|---|---|---|
| VARIABLE 1 | 2 | 2 | 1 | 2 | 2 | 2 | 2 | 2 |

~801

↓ SORTING

| VARIABLE\PT | D1 | D2 | D4 | D6 | D7 | D8 | D5 | D3 |
|---|---|---|---|---|---|---|---|---|
| VARIABLE 1 | 2 | 2 | 2 | 2 | 2 | 2 | 2 | 1 |

~802

INTEGRATED BEACON TYPE UPDATE

| VARIABLE\PT | D1 | D2 | D3 | D4 | D5 | D6 | D7 | D8 |
|---|---|---|---|---|---|---|---|---|
| BEACON TYPE | B | B | P | B | B | B | B | B |

PT : PARTICIPATING TERMINAL

| VARIABLE \ PT | D1 | D2 | D3 | D4 | D5 | D6 | D7 | D8 |
|---|---|---|---|---|---|---|---|---|
| VARIABLE 2 | 3 | 3 | 1 | 3 | 2 | 2 | 2 | 2 |
| VARIABLE 3 | 3 | 3 | 3 | 3 | 2 | 2 | 3 | 1 |
| VARIABLE 4 | 3 | 1 | 3 | 3 | 3 | 3 | 2 | 2 |

| VARIABLE \ PT | D1 | D2 | D3 | D4 | D5 | D6 | D7 | D8 |
|---|---|---|---|---|---|---|---|---|
| VARIABLE 2 | 3 | 3 | 1 | 3 | 2 | 2 | 2 | 2 |

~811

↓ SORTING

| VARIABLE \ PT | D1 | D2 | D4 | D5 | D6 | D7 | D8 | D3 |
|---|---|---|---|---|---|---|---|---|
| VARIABLE 2 | 3 | 3 | 3 | 2 | 2 | 2 | 2 | 1 |

~812

INTEGRATED BEACON TYPE UPDATE

| VARIABLE \ PT | D1 | D2 | D3 | D4 | D5 | D6 | D7 | D8 |
|---|---|---|---|---|---|---|---|---|
| BEACON TYPE | B | B | P | B | M2 | M2 | M2 | M2 |

PT : PARTICIPATING TERMINAL

| VARIABLE\PT | D1 | D2 | D3 | D4 | D5 | D6 | D7 | D8 |
|---|---|---|---|---|---|---|---|---|
| VARIABLE 3 | 3 | 3 | 3 | 3 | 2 | 2 | 3 | 1 |
| VARIABLE 4 | 3 | 1 | 3 | 3 | 3 | 3 | 2 | 2 |

| VARIABLE\PT | D1 | D2 | D3 | D4 | D5 | D6 | D7 | D8 |
|---|---|---|---|---|---|---|---|---|
| VARIABLE 3 | 3 | 3 | 3 | 3 | 2 | 2 | 3 | 1 |

~821

↓ SORTING

| VARIABLE\PT | D1 | D2 | D3 | D4 | D7 | D5 | D6 | D8 |
|---|---|---|---|---|---|---|---|---|
| VARIABLE 3 | 3 | 3 | 3 | 3 | 3 | 2 | 2 | 1 |

~822

INTEGRATED BEACON TYPE UPDATE

| VARIABLE\PT | D1 | D2 | D3 | D4 | D5 | D6 | D7 | D8 |
|---|---|---|---|---|---|---|---|---|
| BEACON TYPE | B | B | P | B | M3 | M3 | M2 | M2 |

PT : PARTICIPATING TERMINAL

| VARIABLE \ PT | D1 | D2 | D3 | D4 | D5 | D6 | D7 | D8 |
|---|---|---|---|---|---|---|---|---|
| VARIABLE 4 | 3 | 1 | 3 | 3 | 3 | 3 | 2 | 2 |

| VARIABLE \ PT | D1 | D2 | D3 | D4 | D5 | D6 | D7 | D8 |
|---|---|---|---|---|---|---|---|---|
| VARIABLE 4 | 3 | 1 | 3 | 3 | 3 | 3 | 2 | 2 |

~831

↓ SORTING

| VARIABLE \ PT | D1 | D3 | D4 | D5 | D6 | D7 | D8 | D2 |
|---|---|---|---|---|---|---|---|---|
| VARIABLE 4 | 3 | 3 | 3 | 3 | 3 | 2 | 2 | 1 |

~832

INTEGRATED BEACON TYPE UPDATE

| VARIABLE \ PT | D1 | D2 | D3 | D4 | D5 | D6 | D7 | D8 |
|---|---|---|---|---|---|---|---|---|
| BEACON TYPE | B | P | P | B | M3 | M3 | M2_4 | M2_4 |

METHOD FOR OPERATING MULTI-TYPE BEACONS

PRIORITY

This application claims priority under 35 U.S.C. §119(a) to a Korean Patent Application filed in the Korean Intellectual Property Office on Sep. 22, 2009 and assigned Serial No. 10-2009-89813, the entire disclosure of which is incorporated herein by reference.

BACKGROUND OF THE INVENTION

1. Field of the Invention

The present invention generally relates to short-range communication, and more particularly, to a method for operating beacons.

2. Description of the Related Art

A Personal Area Network (PAN), in concept similar to the well known Local Area Network (LAN) or Wide Area Network (WAN), is a unique network owned by an individual. That is, terminals owned by one person form a network for the convenience of that person. The concept of forming a PAN in a wireless manner is referred to as a Wireless Personal Area Network (WPAN).

In an effort to implement PAN in a wireless manner, the Institute of Electrical and Electronics Engineers (IEEE) 802.15 Working Group has defined WPAN as a standard of a short-range wireless network. The IEEE 802.15 Working Group has worked for the IEEE 802.15.1 standard known as Bluetooth®, the IEEE 802.15.3 and IEEE 802.15.3a standards associated with high-rate WPANs, and the IEEE 802.15.4 standard known as ZigBee. In particular, the 802.15.6 TG6 is working to standardize Wireless Body Area Network (WBAN) for providing a medical service such as telemedicine and an entertainment service, using equipment or a motion sensor, for wearable computing, through a nearby communication network, within 3 meters from a human body.

FIG. 1 is a conceptual diagram, which illustrates a general structure of a WBAN, where an individual forms a network, that is, a piconet. The piconet includes a coordinator terminal 10, such as a mobile communication terminal, and a plurality of participating terminals 11, 12, 13, and 14, such as various types of peripheral devices or sensors attached to a human body. Since the WBAN is targeted for a device small in size and a mobile power source, such as a sensor with poor power conditions, low power consumption is the most critical system requirement.

FIG. 2 is a diagram illustrating a structure of a super-frame 20 used in a conventional short-range communication system, which includes a beacon (B) 21, a Contention Access Period (CAP) 22, a Contention Free Period (CFP) 23, and an inactive period 24. The conventional super-frame 20 is provided from the coordinator terminal 10 of FIG. 1 to the participating terminals 11 through 14 of FIG. 1. The beacon 21 provides sync reference time to the participating terminals 11 through 14 of FIG. 1, status of the piconet and the status of resource allocation. In the contention access period 22, the participating terminals 11 through 14 of FIG. 1 transmit requests for joining or leaving the network, requests for resource allocation, requests for connection, and requests for authentication to the coordinator terminal 10 of FIG. 1 based on contention access, and the coordinator terminal 10 of FIG. 1 responds to the requests of the participating terminals 11 through 14 of FIG. 1. In the contention free period 23, the coordinator terminal 10 of FIG. 1 and the participating terminals 11 through 14 of FIG. 1 communicate by using allocated resources (e.g., time slots).

In a short-range communication system, which performs communication by using the above-described super-frame, if a beacon is not transmitted to the participating terminals 11 through 14, the system performance abruptly degrades. Therefore, the beacon requires a design that is more robust to a channel condition than a general data message, and also needs a strong modulation and coding scheme according to system conditions. In a personally tailored communication system such as a WBAN, data security is a major consideration. Consequently, the beacon should be encrypted.

Moreover, when a single beacon is used in a super-frame and a large number of participating terminals are connected to the coordinator terminal, the participating terminals may demand various communication environments. As a result, the beacon design must take into account the requirements of all the participating terminals, to avoid causing unnecessary performance degradation of the participating terminals. In particular, a WBAN requiring low power consumption undergoes significant degradation in efficiency and stability.

SUMMARY OF THE INVENTION

An aspect of the present invention is to address at least the above-mentioned problems and/or disadvantages and to provide at least the advantages described below. Accordingly, an aspect of the present invention is to provide a method for transmitting a beacon suitable for a communication environment between a coordinator terminal and each participating terminal.

In accordance with one aspect of the present invention, there is provided a method for operating multi-type beacons by a first terminal connected with at least one second terminal through short-range communication. The method includes checking at least one variable related to the second terminal, allocating one selected from a plurality of beacons having different characteristics to the second terminal, taking account of the checked variable, and transmitting the beacon allocated to the second terminal.

According to another aspect of the present invention, there is provided a method for receiving multi-type beacons by at least one second terminal connected with a first terminal through short-range communication. The method includes transmitting to the first terminal, beacon allocation requiring information for allocating different beacons, receiving beacon allocation information indicating the beacon allocated by the first terminal, and receiving the beacon corresponding to the beacon allocation information.

BRIEF DESCRIPTION OF THE DRAWINGS

The above and other features and advantages of an embodiment of the present invention will be more apparent from the following detailed description taken in conjunction with the accompanying drawings, in which:

FIGS. 5A through 5C are ladder diagrams illustrating a method for operating beacons according to an embodiment of the present invention;

FIG. 6 is a diagram showing variables collected for a plurality of participating terminals by a method for operating beacons according to an embodiment of the present invention;

FIGS. 8A through 8D are diagrams sequentially showing a process of allocating beacons to participating terminals by a method for operating beacons according to an embodiment of the present invention.

DETAILED DESCRIPTION OF THE EMBODIMENTS OF THE PRESENT INVENTION

Hereinafter, an embodiment of the present invention will be described in detail with reference to the accompanying drawings. In the following description, specific items such as particular components are described only to provide overall understanding of the present invention and it is apparent to those of ordinary skill in the art that changes or modifications can be made without departing from the scope of the present invention.

A piconet, according to an embodiment of the present invention, includes a coordinator terminal, such as a mobile communication terminal, and a plurality of participating terminals such as various types of peripheral devices or sensors attached to a human body.

The coordinator terminal, according to an embodiment of the present invention, generates a super-frame having a plurality of beacons having different characteristics and provides the super-frame to the participating terminals. Thus, the coordinator terminal may be provided with such a variable, necessary for allocating a beacon to each participating terminal, as required security level, from the participating terminal, or may check such a variable generated during communication with the participating terminal as remaining battery capacity, wireless channel condition, or traffic period for the participating terminal. By using the variable provided from the participating terminal or the variable checked during the communication with the participating terminal, the coordinator terminal allocates the plurality of beacons having different characteristics to the participating terminals, respectively.

Figure 1:
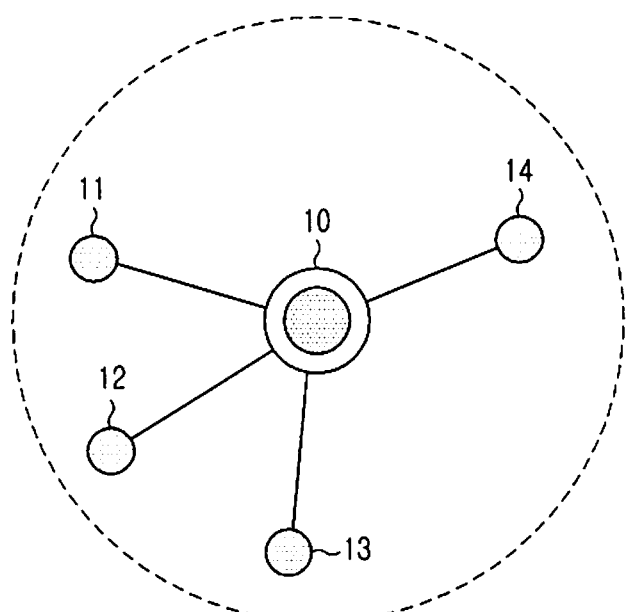
FIG. 1 is a conceptual diagram illustrating a structure of a general WBAN.
Figure 2:
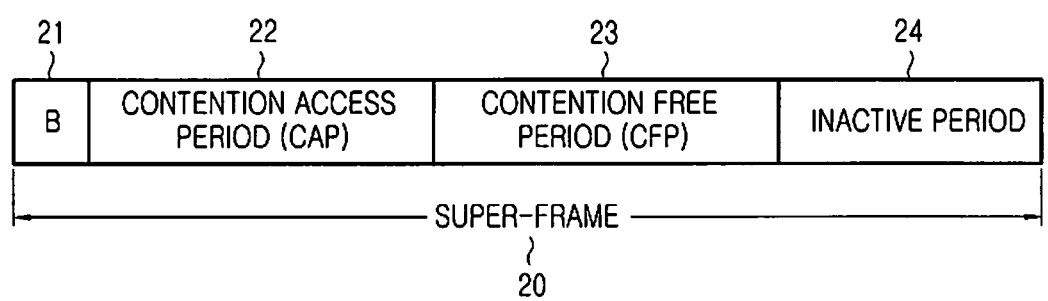
FIG. 2 is a diagram illustrating a structure of a super-frame used in a conventional short-range communication system.
Figure 3:
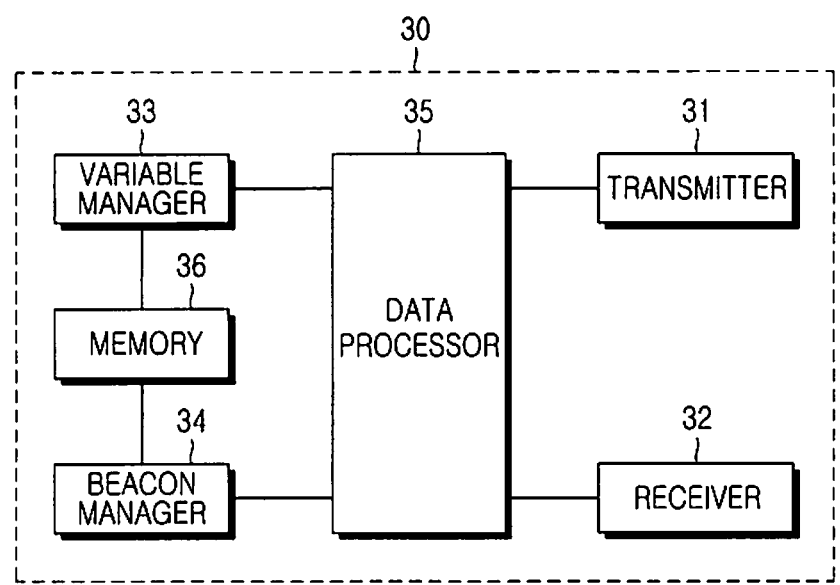
FIG. 3 is a block diagram illustrating a structure of a coordinator terminal according to an embodiment of the present invention.

FIG. 3 is a block diagram illustrating a structure of a coordinator terminal 30 according to an embodiment of the present invention. Referring to FIG. 3, the coordinator terminal 30 includes a transmitter 31 for data transmission, a receiver 32 for data reception, a variable manager 33 for managing a variable required for beacon allocation, a beacon manager 34 for allocating a beacon to each participating terminal by using the variable, and a data processor 35 for generating a super-frame including the beacon and processing data to be transmitted to a participating terminal or data received from the participating terminal. The coordinator terminal 30 may further include a memory 36 for storing data required for operations of the variable manager 33, the beacon manager 34, and the data processor 35 or for storing data generated during the operations of the variable manager 33, the beacon manager 34, and the data processor 35.

More specifically, the variable manager 33 extracts information required for allocating a plurality of beacons having different characteristics to respective participating terminals, for example, battery capacity, required security level, wireless channel condition, and traffic period, for each of the participating terminals. The variable manager 33 stores the extracted information for each participating terminal.

The beacon manager 34 checks the variable stored for each participating terminal by the variable manager 33, and allocates a beacon type to each participating terminal.

More specifically, the coordinator terminal 30 may provide a broadcasting beacon providing system synchronization and resource allocation information to a participating terminal like in a conventional beacon scheme.

In addition, a variable of a participating terminal, such as a wireless channel condition, a traffic period, or a required security level, may be related to a beacon scheme. In a poor wireless channel condition, an error is likely to occur in beacon reception. Thus, to transmit a beacon to a participating terminal in a poor wireless channel condition, a robust modulation and coding scheme needs to be considered in the system design. Likewise, in case of a long traffic period, for system synchronization with a beacon, a clock drift may occur where an error occurs in an internal timer of a participating terminal. The clock drift corresponds to several tens of ppm, and is expected to be about 20-50 ppm in a sensor network. Consequently, to avoid missing synchronization with a beacon within such an error range, it is necessary to provide an extra guard interval before and after a beacon message or provide for a correction function in other ways in the beacon design. Moreover, for a specific participating terminal requiring a high security level, the beacon needs to be encrypted before it is provided to the terminal. Thus, beacon transition to each participating terminal should take account of the wireless channel condition, traffic period, or required security level of the participating terminal. However, a participating terminal in good wireless channel condition does not require a robustly modulated and coded beacon; a participating terminal having a short traffic period does not require a beacon having a long extra interval; a participating terminal having a low required security level does not require an encrypted beacon. Therefore, by providing a suitable beacon, i.e., a multicasting beacon, to a participating terminal which requires a robust modulation and coding scheme, an extra interval, or encryption, other participating terminals do not experience unnecessary resource consumption due to the same collectively transmitted beacon.

Furthermore, for communication with the coordinator terminal 30, a participating terminal first receives a beacon and decrypts resource allocation information to know its resource allocation position, and connects to a system when an allocated resource is secured. However, for a participating terminal providing a service that generates periodic traffic, communication with the coordinator terminal 30 is possible merely by designating one participating terminal and providing only system synchronization without resource allocation information to the participating terminal, rather than using a conventional beacon scheme. Thus, for such a participating terminal, which can communicate with the coordinator terminal 30 with system synchronization without resource allocation information, the coordinator terminal 30 determines a polling period and a timing and informs the coordinator terminal 30 of the polling period and the timing at the time of initial connection of the participating terminal, and then transmits only a polling beacon to the participating terminal. Thus, the participating terminal receiving the polling beacon can communicate with the coordinator terminal 30 without unnecessary power consumption.

Considering the foregoing, the beacon manager 34 checks a variable of each participating terminal, allocates a beacon type to each participating terminal, and stores the beacon type.

The data processor 35 generates a super-frame including a plurality of beacons managed by the beacon manager 34 and transmits the super-frame. The data processor 35 also generates a beacon including information indicating a beacon type allocated to each participating terminal by the beacon manager 34, and provides the beacon to the super-frame.

Figure 4:
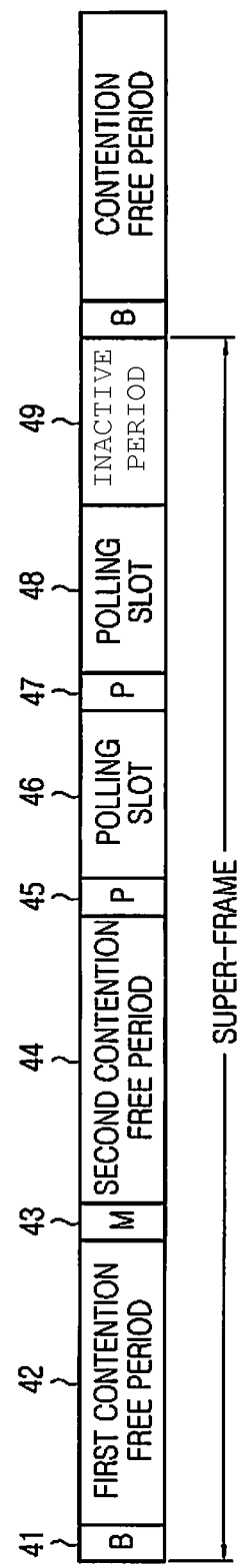
FIG. 4 is a diagram illustrating a structure of a super-frame generated by a coordinator terminal according to an embodiment of the present invention.

FIG. 4 is a diagram illustrating a structure of a super-frame generated by a coordinator terminal according to an embodiment of the present invention. Referring to FIG. 4, the super-frame generated according to an embodiment of the present invention includes a broadcasting beacon (B) 41, a first contention free period (CFP) 42 allocated to participating terminals receiving the broadcasting beacon 41, a multicasting beacon (M) 43, a second contention free period 44 allocated to participating terminals receiving the multicasting beacon 43, a first polling beacon 45, a polling slot 46 allocated to a participating terminal receiving the first polling beacon 45, a second polling beacon 47, a polling slot 48 allocated to a participating terminal receiving the second polling beacon 47, and an inactive period 49.

Although the structure of the super-frame generated by the coordinator terminal has been illustrated as in FIG. 4, the present invention is not limited thereto. For example, a plurality of multicasting beacons 43 may be provided, and the second contention free period 44 corresponding to each of the multicasting beacons 43 may be provided. As an alternative to providing the contention free periods 42 and 44 corresponding to the broadcasting beacon 41 and the multicasting beacon 43, contention access periods may be provided.

The coordinator terminal provides sync information and resource allocation information, e.g., a time slot, to participating terminals to which the broadcasting beacon 41 is allocated, by using the broadcasting beacon 41, and transmits and receives data to and from the resource-allocated participating terminals in the first contention free period 42. The coordinator terminal provides sync information and resource allocation information, e.g., a time slot, to participating terminals to which the multicasting beacon 43 is allocated, by using the multicasting beacon 43, and transmits and receives data to and from the resource-allocated participating terminals in the second contention free period 44. The first polling beacon 45 or the second polling beacon 47 provides sync information to a corresponding participating terminal and transmits and receives data to and from the participating terminal receiving the first polling beacon 45 or the second polling beacon 47 through polling slot 46 or polling slot 48, allocated to the participating terminal.

Meanwhile, the participating terminal includes a transmitter and a receiver for processing data transmission and reception to and from the coordinator terminal, and a data processor for processing data generated during communication with the coordinator terminal. In particular, the data processor generates beacon allocation requiring information for allocating different beacons by the coordinator terminal, checks a type of a beacon transmitted from the coordinator terminal, and checks sync information and resource allocation information associated with the coordinator terminal. Herein, the beacon allocation requiring information may be information including a combination of at least one or two of a battery capacity, channel condition of a communication link connected with a first terminal, traffic period of a communication link connected with the first terminal, and security level of a beacon.

Moreover, the data processor, upon receiving a second beacon where error-resilient modulation and coding is set, may check information included in the second beacon through error-resilient modulation and coding, upon receiving the second beacon where a guard interval is set, may receive the second beacon considering a length of the guard interval, and upon receiving the second beacon where encryption is set, may decrypt the second beacon. Upon receiving a third beacon, the data processor may generate a control signal for controlling operations of the transmitter and the receiver and provide the control signal to the transmitter and the receiver, so that the transmitter and the receiver can operate for a predetermined time from the reception of the third beacon.

Figure 5B:
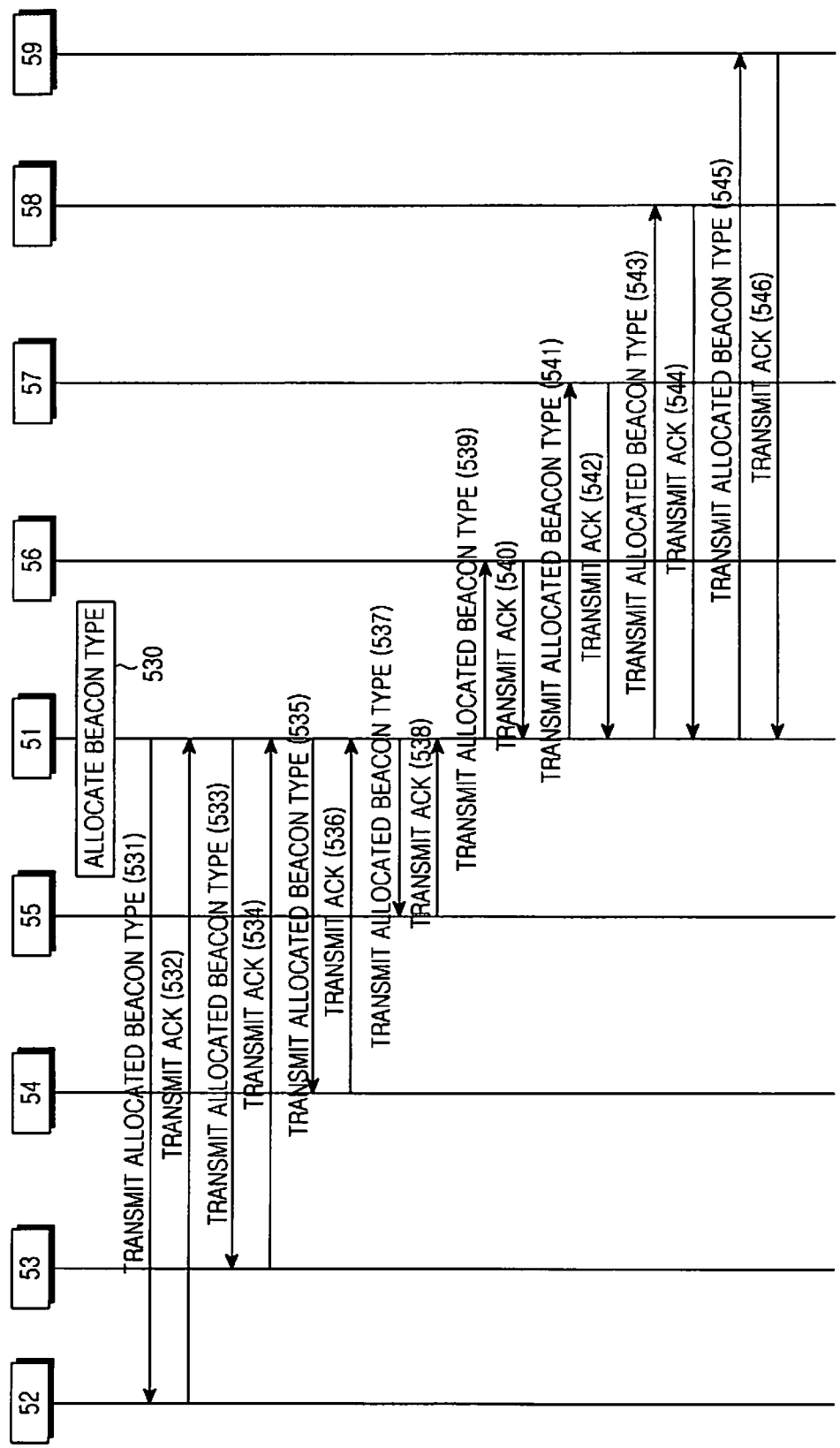
Figure 5C:
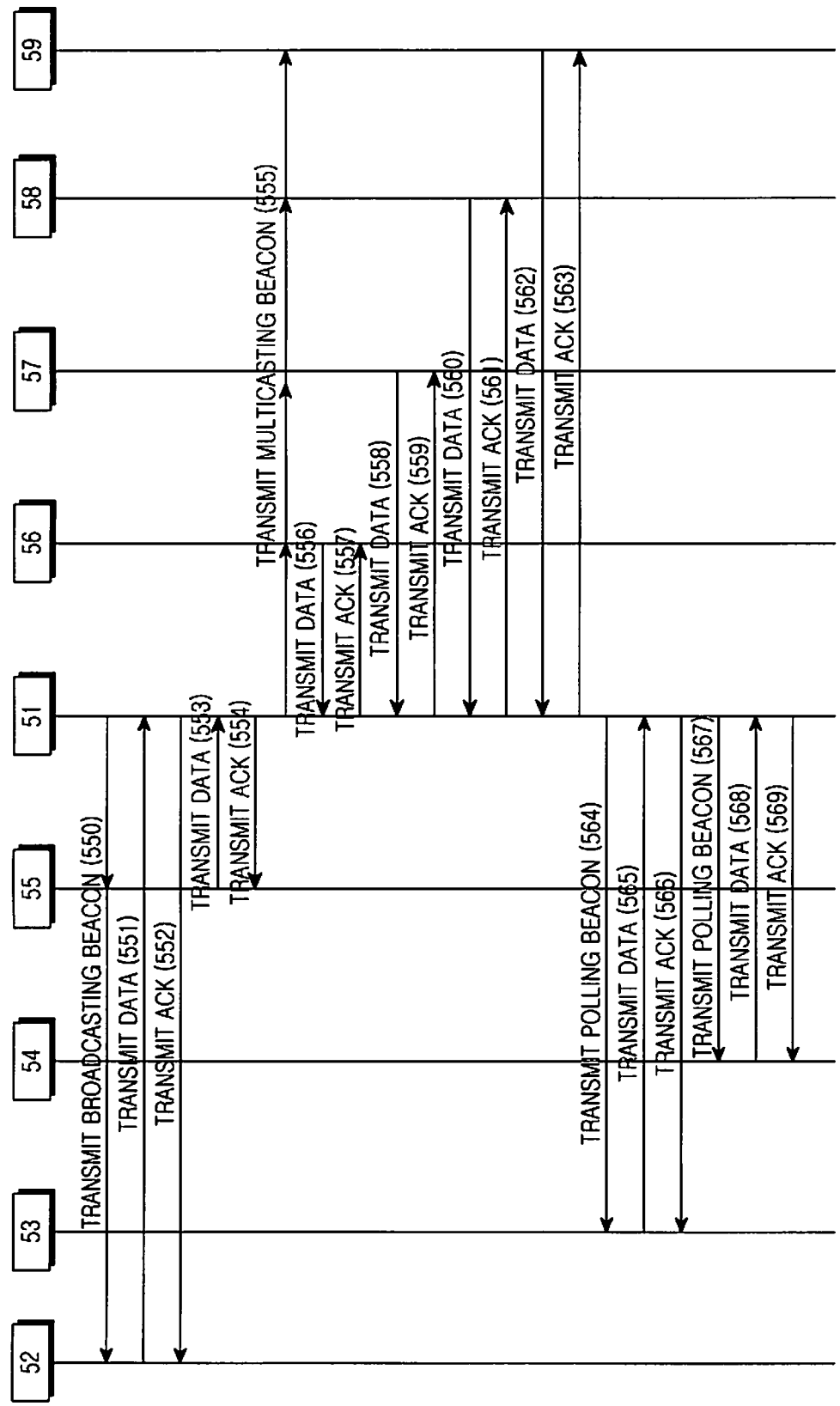

FIGS. 5A through 5C are ladder diagrams which illustrate a method for operating beacons according to an embodiment of the present invention. FIGS. 5A through 5C sequentially show operations between a coordinator terminal 51 and eight, i.e. first through eighth, participating terminals 52 through 59.

FIG. 5A illustrates a process in which the coordinator terminal 51 collects variables required for beacon allocation from the eight participating terminals 52 through 59.

At an initial stage, the coordinator terminal 51 allocates a broadcasting beacon to the eight participating terminals 52 through 59. The coordinator terminal 51 transmits the broadcasting beacon including sync information and resource allocation information (time slot) of the respective participating terminals, 52 through 59, to the participating terminals 52 through 59 in step 501. The first participating terminal 52 transmits its battery capacity and required security level to the coordinator terminal 51 in its allocated time slot in step 502. The coordinator terminal 51 then transmits an Acknowledgement (ACK) message to the first participating terminal 52 in step 503, and checks and stores information about a communication link, e.g., a wireless channel condition and a traffic period, together with the battery capacity and required security level transmitted from the first participating terminal 52, in step 504. In this manner, the coordinator terminal 51 executes the process of collecting variables required for beacon allocation (including steps 505 through 525) for the second through eighth participating terminals, 53 through 59. Variables collected for the first through eighth participating terminals, 52 through 59, in steps 501 through 525 are shown in FIG. 6. In FIG. 6, D1 through D8 indicate the first through eighth participating terminals, 52 through 59.

FIG. 5B illustrates a process in which the coordinator terminal 51 allocates beacons for the participating terminals 52 through 59 and provides the allocated beacons to the participating terminals 52 through 59.

The coordinator terminal 51 allocates a beacon type to each of the participating terminals 52 through 59 by referring to the variables shown in FIG. 6, and stores the beacon type allocated to each of the participating terminals, 52 through 59, in step 530. The coordinator terminal 51 then informs the first participating terminal 52 of a beacon type, allocated to the first participating terminal 52, in a time slot allocated to the first participating terminal 52 in step 531, and receives an ACK message from the first participating terminal 52 in step 532. In the same manner, a beacon type allocated to each of the second through eighth participating terminals, 53 through 59, is transmitted in steps 533 through 546. A beacon type allocated to each of the first through eighth participating terminals, 52 through 59, may be as shown in Table 1.

TABLE 1

| | Participating Terminal | | | | | | | |
|---|---|---|---|---|---|---|---|---|
| | D1 | D2 | D3 | D4 | D5 | D6 | D7 | D8 |
| Beacon Type | B | P | P | B | M | M | M | M |

In Table 1, beacon types B, M, and P indicate a broadcasting beacon, a multicasting beacon, and a polling beacon, respectively.

FIG. 5C illustrates a process in which the coordinator terminal 51 transmits data to the participating terminals 52 through 59 to which the beacon types are allocated, by using the provided beacons.

The coordinator terminal 51 transmits a broadcasting beacon including time synch and information about the time slot to the first participating terminal 52 and the fourth participating terminal 55 to which the broadcasting beacon is allocated, in step 550. The first participating terminal 52, to which a first time slot of the first contention free period 42 is allocated, transmits data to the coordinator terminal 51 in step 551, and the coordinator terminal 51 then responds with an ACK message in step 552. Likewise, the fourth participating terminal 55, to which a second time slot of the first contention free period 42 is allocated, transmits data to the coordinator terminal 51 in step 553, and the coordinator terminal 51 then responds with an ACK message in step 554.

The coordinator terminal 51 transmits a multicasting beacon, which includes time sync and information about the time slot and is set considering the wireless channel condition, traffic period, and required security level, to the fifth through eighth participating terminals 56, 57, 58, and 59 to which the multicasting beacon is allocated, in step 555. The fifth participating terminal 56 to which a first time slot of the second contention free period 44 is allocated transmits data to the coordinator terminal 51 in step 556, and the coordinator terminal 51 responds with an ACK message in step 557. Similarly, the sixth participating terminal 57 to which a second time slot of the second contention free period 44 is allocated transmits data to the coordinator terminal 51 in step 558, and receives an ACK message in step 559. The seventh participating terminal 58 to which a third time slot of the second contention free period 44 is allocated transmits data to the coordinator terminal 51 in step 560, and receives an ACK message in step 561. The eighth participating terminal 59 to which a fourth time slot of the second contention free period 44 is allocated transmits data to the coordinator terminal 51 in step 562, and receives an ACK message in step 563.

The coordinator terminal 51 transmits a polling beacon including time sync to the second participating terminal 53 to which the polling beacon is allocated, in step 564. In response thereto, the second participating terminal 53 transmits data to the coordinator terminal 51 without separately checking information about the time slot, in step 565, and receives an ACK message in step 566. Likewise, the coordinator terminal 51 transmits a polling beacon including time sync to the third participating terminal 54 in step 567, and the third participating terminal 54 transmits data to the coordinator terminal 51 without separately checking information about the time slot in step 568, and receives an ACK message in step 569.

Figure 7:
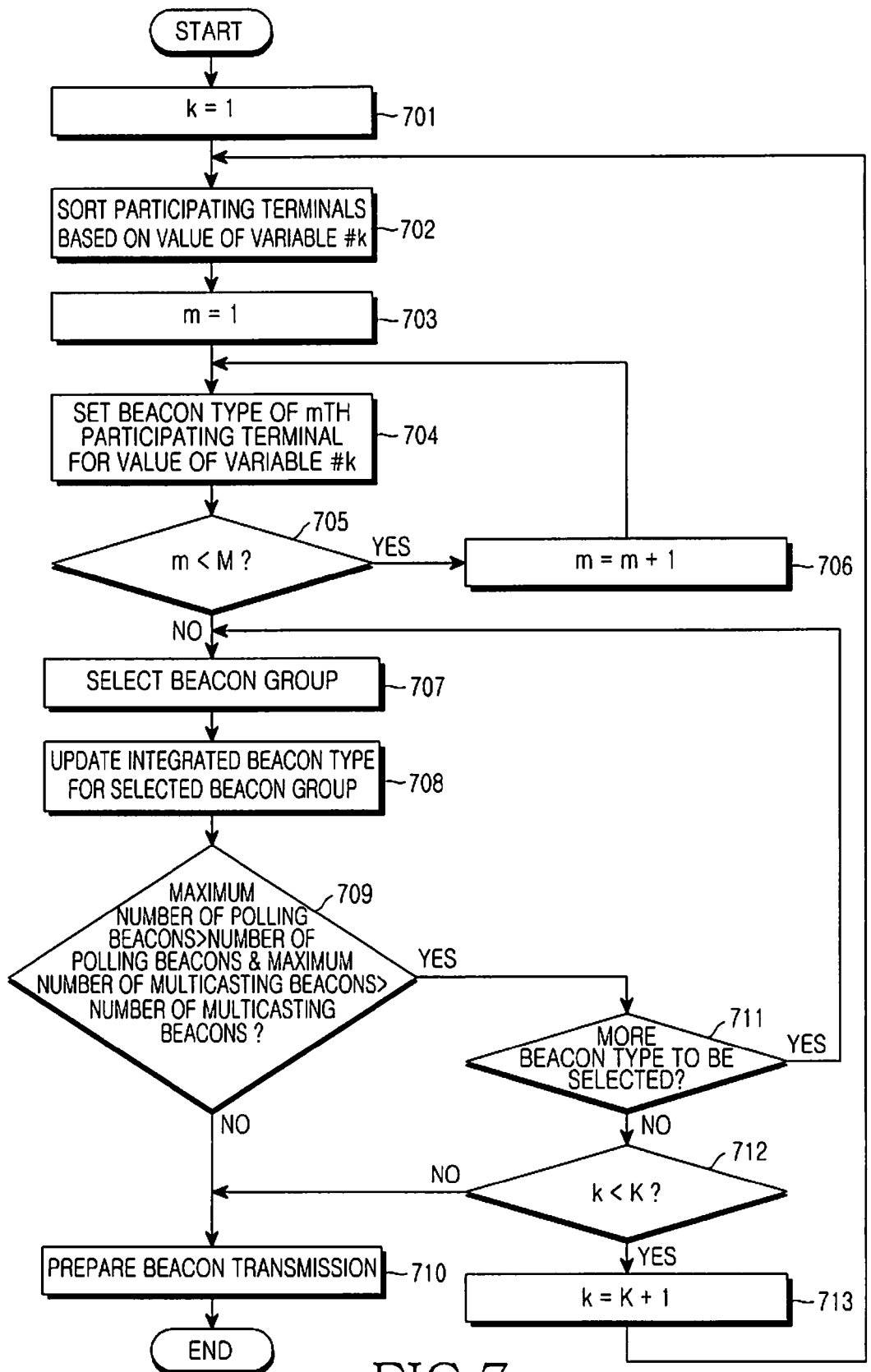
FIG. 7 is a flowchart illustrating a beacon allocation process of a method for operating beacons according to an embodiment of the present invention.

FIG. 7 is a flowchart illustrating a beacon allocation process of a method for operating beacons according to an embodiment of the present invention. In the beacon allocation process according to an embodiment of the present invention, four variables, that is, variable #1, variable #2, variable #3, and variable #4, are collected and values k indicating variable #1, variable #2, variable #3, and variable #4 are 1, 2, 3, and 4. The maximum number K of variables is set to 4. To set a beacon type based on variable #1, the value #k indicating a variable is set to 1 in step 701.

In step 702, the participating terminals 52 through 59 are sorted based on values of variables of the participating terminals 52 through 59. For example, when values of variable #1 for the participating terminals 52 through 59 are as shown in a second table 801 of FIG. 8A, the participating terminals 52 through 59 are sorted in descending order based on the values of variable #1 (or variable #k), thus setting a third table 802 of FIG. 8A.

In step 703, to facilitate grouping of the same beacon type, according to the sorting order based on values of variables, a variable having top priority may be set to variable #1 and a variable having bottom priority may be set to variable #M.

In step 704, for the value of variable #1 (or variable #k), according to previously stored relation data between variable value and beacon type, a beacon type of an $m^{th}$ participating terminal is set. By repeating steps 705 and 706, beacon types for the participating terminals 52 through 59 are set.

In step 707, one beacon group is selected based on the beacon types which have been set in the previous stage. More specifically, a beacon group including the first participating terminal is selected and the process goes to step 708. Thereafter, when the process goes back to step 707, a beacon group including the foremost participating terminal among the sorted participating terminals, that is, a participating terminal having the smallest value for m, is selected instead of the previously selected beacon group. In this way, in step 707, a beacon group is selected one by one in order of a polling beacon, a multicasting beacon, and a broadcasting beacon based on a value of a $k^{th}$ variable (variable #k).

In step 708, integrated beacons of original participating terminals corresponding to the selected beacon group are updated. For example, as in the fourth table 803 of FIG. 8A, integrated beacon types of the participating terminals 52 through 59 are updated.

In step 709, after update is completed for one beacon group, it is determined whether the number of multicasting beacons is smaller than the maximum number of multicasting beacons, or the number of polling beacons is smaller than the maximum number of polling beacons. If so, the process goes to step 711 to select the next beacon group which has not yet been selected in order of a polling beacon, a multicasting beacon, and a broadcasting beacon, and to repeat the update process. If the number of corresponding beacons is equal to the maximum number of corresponding beacons, the process goes to step 710 to finally fix current integrated beacon scheme setting data and go to a beacon transmission preparing stage.

If there is no more group to be updated for the $k^{th}$ variable (variable #k) during the update process, the process goes to step 712 to check if beacon update has been completed for all variables. If so, the process goes to step 710; whereas if not, the process goes to step 713 to repeat the process from the sorting step 702 for a $(k+1)^{th}$ variable (variable #(k+1)).

The beacon types allocated to the participating terminals 52 through 59 are updated based on a predetermined rule in the integrated beacon type update step 708 for the $k^{th}$ variable (variable #k). For example, when an integrated beacon type allocated to a participating terminal, for example, a participating terminal A, is a broadcasting beacon, update may be performed if a beacon type of the participating terminal A updated in the beacon type setting step 707 is a multicasting beacon or a polling beacon. When an integrated beacon type allocated to a participating terminal B which is different from the participating terminal A is a multicasting beacon, an update may be performed if the beacon type of the participating terminal B updated in the beacon type setting step 707 is a polling beacon. As another example, in addition to the foregoing method, an inter-multicasting-beacon update method may be specified. It is proper that multicasting beacons, although being of the same type, should be set as different multicasting beacons for multicasting beacon groups which need different variables as requirements. For example, if, among participating terminals 1, 2, 3, and 4 adopting robust modulation and coding due to poor channel conditions, the participating terminals 3 and 4 require strong security, a multicasting beacon group 1 may be set for the participating terminals 1 and 2 and a multicasting beacon group 2 may be set for the participating terminals 3 and 4.

A multicasting beacon may include several characteristics such as robust modulation and coding, length of the guard interval, and encryption, and thus the multicasting beacon may include a first multicasting beacon, a second multicasting beacon, and a third multicasting beacon. Moreover, the multicasting beacon may be freely changed into a multicasting beacon having a different characteristic (for example, the first multicasting beacon, the second multicasting beacon, or the third multicasting beacon).

Through the foregoing procedure, the update of beacon types for K (e.g., 4) variables is repeated. For example, by referring to a second table 811 of FIG. 8B which extracts variable #2 among variables shown in a first table of FIG. 8B (a table located top in FIG. 8B), the participating terminals 52 through 59 may be sorted in a descending order (as shown in a third table 812) and integrated beacon types of the participating terminals 52 through 59 for variable #2 are updated as in a fourth Table 813 of FIG. 8B. Next, by referring to a second table 821 of FIG. 8C which extracts variable #3 among the variables of a first table of FIG. 8C, the participating terminals 52 through 59 may be sorted in a descending order (as shown in a third table 822) and integrated beacon types of the participating terminals 52 through 59 for variable #3 are updated as in a fourth Table 823 of FIG. 8C. Next, by referring to a second table 831 of FIG. 8D which extracts variable #4 among the variables of a first table 831 of FIG. 8D, the participating terminals 52 through 59 may be sorted in a descending order (as shown in a third table 832) and integrated beacon types of the participating terminals 52 through 59 for the fourth variable are updated as in a fourth table 833 of FIG. 8D. In the fourth table 833 of FIG. 8D, a multicasting beacon group M3 and a multicasting beacon group M2_4 are set as different multicasting beacons and thus two types of multicasting beacons are included in a super-frame.

As can be appreciated from the foregoing description, according to the present invention, participating terminals can properly connect to various types of beacons. Thus, without designing all the same beacons according to requirements of all participating terminals, beacons are provided on the basis of participating terminals having the same or similar requirements, thereby reducing the error rate of short-range communication and improving the success rate of system synchronization.

Moreover, by separately providing a beacon requiring a particular goal, such as security requirements, and a beacon requiring a basic function, such as time sync or connection information, the beacons can be efficiently operated in the system, reducing power consumption of the system.

While the present invention has been shown and described with reference to an embodiment thereof, it will be understood by those skilled in the art that various changes in form and details may be made therein without departing from the spirit and scope of the invention as defined by the appended claims.

What is claimed is:

1. A method for operating multi-type beacons by a first terminal connected with at least one second terminal through short-range communication, the method comprising:
   receiving, at the first terminal, from the at least one second terminal, beacon allocation requiring information required for allocating a beacon type;
   selecting, at the first terminal, a beacon type for each of the at least one second terminal from a plurality of predetermined beacon types based on at least one variable in the beacon allocation requiring information,
   wherein the at least one variable comprises at least one of a channel condition of a communication link connected with the at least one second terminal, a traffic period of the communication link connected with the at least one second terminal, and a security level of transmission and reception data, wherein each of the at least one variable comprises a priority;
   allocating, by the first terminal, a beacon to the at least one second terminal based on the priority of each of the at least one variable, wherein the beacon has the beacon type; and
   transmitting the beacon allocated to the at least one second terminal, from the first terminal to the at least one second terminal.

2. The method of claim 1, wherein the plurality of predetermined beacon types comprises:
   a first beacon type that is broadcasted and comprises time sync information and time slot information of the at least one second terminal;
   a second beacon type that has a characteristic set based on the at least one variable related to the at least one second terminal; and
   a third beacon type that provides the time sync information and connection information of the at least one second terminal through a polling signal.

3. The method of claim 2, wherein, in the second beacon type, error-resilient modulation and coding is set based on a wireless channel condition of a communication link connected with the at least one second terminal.

4. The method of claim 2, wherein, in the second beacon type, a guard interval is set based on a traffic period.

5. The method of claim 2, wherein, in the second beacon type, application of security is set based on a security level of data transmitted to and received from the at least one second terminal.

6. The method of claim 1, further comprising:
   setting priorities of at least two variables;
   allocating the beacon to the at least one second terminal, taking into account a first variable having a top priority; and
   allocating the beacon to the at least one second terminal, taking into account a second variable having a priority lower than that of the first variable, and updating the beacon allocated to the at least one second terminal.

7. The method of claim 6, wherein the beacon allocated to the at least one second terminal is updated according to a predetermined rule, and the predetermined rule comprises:
   a rule for changing the beacon allocated to the at least one second terminal from the first beacon type into the second beacon type or the third beacon type; and
   a rule for changing the second beacon type into the third beacon type.

8. The method of claim 7, wherein the predetermined rule further comprises a rule for changing the second beacon type having a first characteristic into the second beacon type having a second characteristic that is different from the first characteristic.

9. The method of claim 1, wherein the at least one variable further comprises a battery capacity of the at least one second terminal.

10. The method of claim 1, further comprising transmitting a super-frame comprising a first beacon the first beacon type, a first contention free period comprising a time slot of one of the at least one second terminal to which the first beacon is allocated, a second beacon of the second beacon type, a second contention free period comprising a time slot of another of the at least one second terminal to which the second beacon is allocated, a third beacon of the third beacon type, and a polling period corresponding to the third beacon.

11. The method of claim 1, wherein the at least one variable also comprises a status of the at least one second terminal, and a data characteristic of transmission and reception data.

12. A method for receiving multi-type beacons by at least one second terminal connected with a first terminal through short-range communication, the method comprising the steps of:
transmitting, from the at least one second terminal, to the first terminal, beacon allocation requiring information required for allocating a beacon type,
wherein the beacon allocation requiring information comprises at least one variable related to the at least one second terminal, and
the at least one variable comprises at least one of a channel condition of a communication link connected with the at least one second terminal, a traffic period of the communication link connected with the at least one second terminal, and a security level of transmission and reception data, wherein each of the at least one variable comprises a priority; and
receiving a beacon, at the at least one second terminal, from the first terminal, wherein the beacon has a beacon type that is selected from a plurality of predetermined beacon types based on the priority of each of the at least one variable.

13. The method of claim 12, wherein the at least one variable further comprises a battery capacity.

14. The method of claim 12, wherein the plurality of predetermined beacon types comprises:
a first beacon type that is broadcasted and comprises time sync information and time slot information;
a second beacon type that has a characteristic set based on a channel environment; and
a third beacon type that provides information about a timing of connection with the first terminal through a polling signal.

15. The method of claim 14, wherein upon reception of the beacon of the second beacon type where error-resilient modulation and coding is set, information included in the beacon is checked by performing the error-resilient modulation and coding on the beacon.

16. The method of claim 14, wherein upon reception of the beacon of the second beacon type where a guard interval is set, the beacon is received considering a length of the guard interval.

17. The method of claim 14, wherein upon reception of the beacon where encryption is set, the beacon is decrypted.

18. The method of claim 14, wherein upon reception of the beacon of the third beacon type, transmission and reception of data are performed for a predetermined time from the reception of the beacon.

19. The method of claim 12, wherein the at least one variable also comprises a status of the at least one second terminal, and a data characteristic of transmission and reception data.

20. An apparatus for operating multi-type beacons, the apparatus comprising:
a memory; and
a processor coupled to the memory and configured to receive beacon allocation requiring information required for allocating a beacon type, select beacon type each for the at least one second terminal from a plurality of predetermined beacon types based on a plurality of variables in the beacon allocation requiring information,
wherein the plurality of variables comprises a channel condition of a communication link connected with a terminal, a traffic period of the communication link connected with the terminal, and a security level of transmission and reception data, wherein each of the plurality of variables comprises a priority,
allocate a beacon to the terminal based on the priority of each of the plurality of variables, wherein the beacon has the beacon type, and transmit the beacon allocated to the terminal.

21. An apparatus for receiving multi-type beacons, the apparatus comprising:
a memory; and
a processor configured to transmit, to a terminal, beacon allocation requiring information required for allocating a beacon type,
wherein the beacon allocation requiring information comprises a plurality of variables related to the apparatus, and
the plurality of variables comprises a channel condition of a communication link connected with the terminal, a traffic period of the communication link connected with the terminal, and a security level of transmission and reception data, wherein each of the plurality of variables comprises a priority, and receive a beacon, from the terminal, wherein the beacon has a beacon type that is selected from a plurality of predetermined beacon types based on the priority of each of the plurality of variables.

22. A system for operating multi-type beacons, the system comprising:
a first terminal configured to transmit beacon allocation requiring information required for allocating a beacon type,
wherein the beacon allocation requiring information comprises a plurality of variables related to the first terminal, and
the plurality of variables comprises a channel condition of a communication link connected with a second terminal, a traffic period of the communication link connected with the second terminal, and a security level of transmission and reception data, and receive a beacon, wherein each of the plurality of variables comprises a priority; and
the second terminal configured to receive the beacon allocation requiring information, select a beacon type for each of the at least one second terminal from a plurality of predetermined beacon types based on the priority of each of the plurality of variables in the beacon allocation requiring information, allocate the beacon to the first terminal, wherein the beacon has the beacon type, and transmit the beacon allocated to the first terminal.

\* \* \* \* \*